Dec. 27, 1955 W. R. GEMMEL 2,728,811

DISABLING APPARATUS FOR TELEGRAPH RECEIVERS

Filed May 6, 1952 2 Sheets-Sheet 2

INVENTOR
WILBUR R. GEMMEL
BY Emery Robinson
ATTORNEY

DISABLING APPARATUS FOR TELEGRAPH RECEIVERS

Filed May 6, 1952 2 Sheets-Sheet 1

INVENTOR
WILBUR R. GEMMEL
BY Emery Robinson
ATTORNEY 2,728,811
Patented Dec. 27, 1955

2,728,811

DISABLING APPARATUS FOR TELEGRAPH RECEIVERS

Wilbur R. Gemmel, Wheaton, Ill., assignor to Teletype Corporation, Chicago, Ill., a corporation of Delaware Application May 6, 1952, Serial No. 286,309
7 Claims. (Cl. 178—4.1)

This invention relates to disabling apparatus for telegraph receivers and more particularly to apparatus for disabling a telegraph receiver upon reception of a predetermined number of preconcerted telegraph signals.

In operation of many types of telegraph systems, there often exists periods of time when various portions of the component equipment is being utilized in the performance of useless operations. Such a situation is present in the operation of one type of diplex telegraph system wherein one channel is being utilized for the transmission of intelligence signals and the other channel is being utilized to transmit letters signals which are indicative of a condition in which no intelligence signals are being imparted to that channel. In use of a start-stop telegraph system employing the Baudot code, the reception of letters signals by the terminal receiving devices causes the operation of such devices. If the terminal receiving device is a perforator, then the reception of the letters signals will cause the perforator to feed the recording tape upon each reception of a letters signal, and obviously this operation is a wasteful expenditure of the recording tape. If the terminal receiving equipment is a telegraph page printer, then the reception of the letters signals causes the printer platen mechanism to be operated upon reception of each letters signal, therefore, subjecting the various elemental parts comprising the platen shift mechanism to undue wear and hence decreasing the useful life of these elemental parts. It is apparent that useless and wasteful operation of other types of terminal receiving equipment can be conceived wherein such terminal receiving equipment will perform various functions in response to the reception of letters signals.

It is a cardinal object of this invention to provide apparatus for disabling telegraph receivers upon reception of a predetermined number of preconcerted telegraph signals.

More specifically, it is an object of this invention for disabling telegraph receivers upon the reception of a predetermined number of signals which are representative of an idle condition on the transmission channel.

Another object of the present invention is the provision of means for varying the number of preconcerted signals that must be received prior to the functioning of the disabling apparatus.

A further object of the invention is to provide means for rendering the receiving apparatus operative upon the reception of the first signal other than the preconcerted signal.

The present invention is described in relation to a telegraph receiver such as shown in the patent to S. Morton et al., No. 1,745,633, dated February 4, 1930; however, the disclosure of this patent is only utilized for the purposes of illustrating the principles of the present invention. This patented disclosure is not to be construed as limiting the application of the principles of the present invention to the telegraph receivers illustrated therein because it is to be understood that the present invention may be incorporated in numerous other types of telegraph receiving apparatus wherein it is desired to accomplish the afore-enumerated objects of the invention. In the present description only those portions of the S. Morton et al. patent are repeated in order to make the present invention more readily comprehendable and those portions of the S. Morton et al. patent which are unnecessary for a complete understanding of the present invention are omitted from the present description for the purpose of simplifying the disclosure.

With these and other objects in view the present invention contemplates a selector mechanism for actuating a telegraph receiver. A number of elements, corresponding in number to the number of elements in the telegraph code utilized, are permutatively positioned in accordance with each received signal. These elements act as storing means for each signal prior to its utilization in the actuation of the telegraph receiver. During the period in which the signals are stored in the elements, sensing means are actuated to sense the permutative setting of the elements and if the sensing means ascertains the presence of a preconcerted permutative setting of the elements a disabling apparatus is initiated into operation. The disabling apparatus is ineffective to prevent the operation of the telegraph receiver until a predetermined number of signals have been received; therefore, the reception of the preconcerted signal during this period causes the telegraph receiver to perform the normal functions associated with preconcerted signals. In the present invention, a clutch is illustrated as controlling the operation of the telegraph receiver subsequent to each permutative setting of the storage elements. If a situation arises wherein a predetermined number of the preconcerted signals are received, then the disabling apparatus is rendered effective to move a latch to engage with a trip lever of the clutch to prevent the operation of the clutch and as a consequence the operation of the telegraph receiver is precluded. Upon the reception of any signal other than the preconcerted signal in the storage means following an operation of the disabling apparatus, means are actuated to restore the disabling apparatus to its initial condition and hence remove the latch from the clutch trip lever in order that this signal may be immediately transferred to telegraph receiver to perform its assigned function.

Other objects and advantages of the invention will be apparent from the following detailed description when considered in conjunction with the accompanying drawings wherein.

Figures 1, 2:
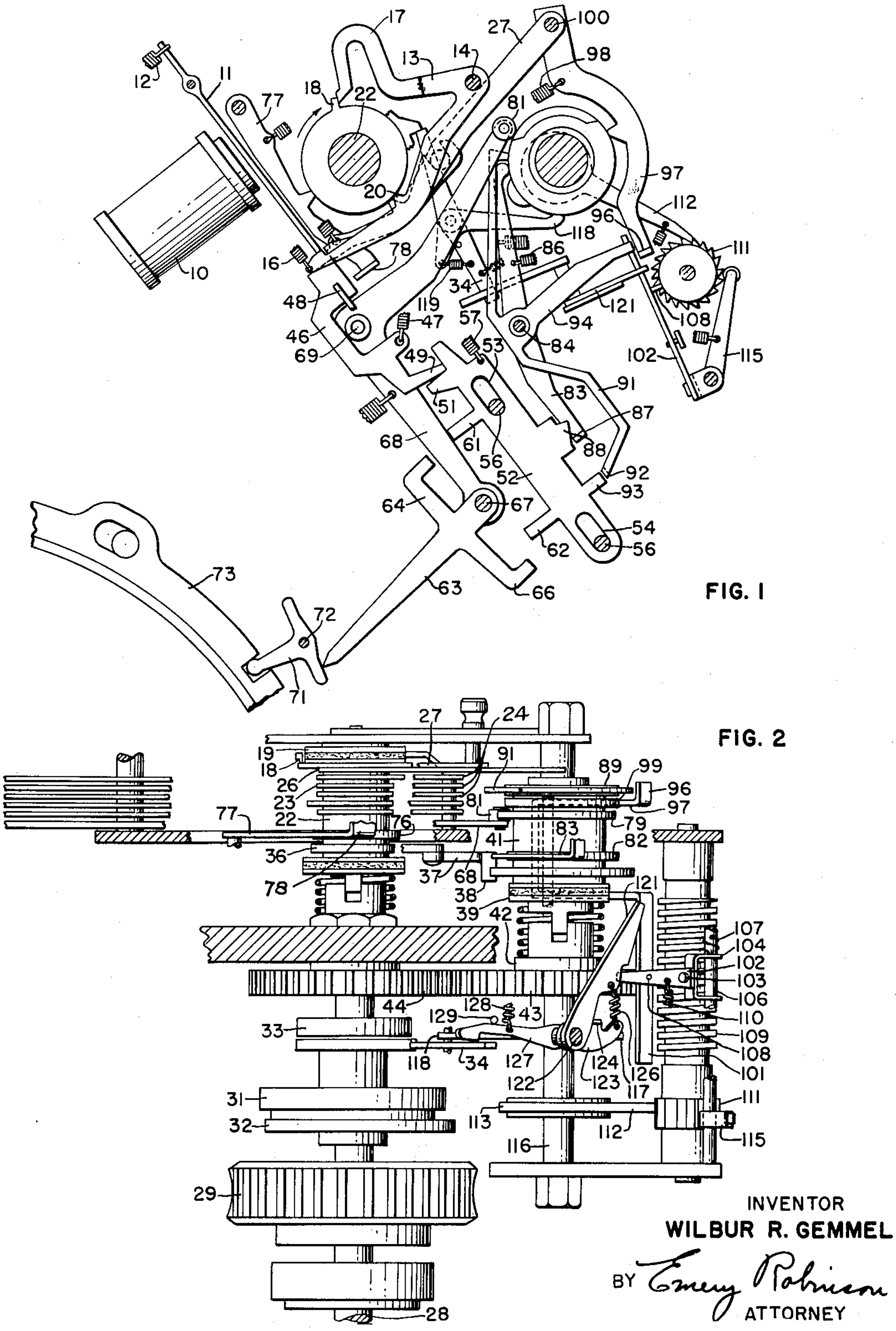
Fig. 1 is a top plan view of a portion of a telegraph receiver having associated therewith a disabling apparatus embodying the principal features of the invention.
Fig. 2 is a side elevational view of the telegraph receiver shown in Fig. 1.

Referring to Fig. 1 there is shown a selector magnet 10 adapted to receive telegraph signals over an incoming signalling channel. The signals utilized to illustrate the present invention are of the well known start-stop Baudot code type. In Fig. 1, magnet 10 is shown as being in an energized condition which is indicative of a condition wherein no intelligence signals are being imparted to the signalling channel and a steady current or marking condition exists in the signalling channel. Associated with the magnet 10 is an armature 11 drawn up against the action of a biasing spring 12. Engaging the forward tip of the armature 11 is a clutch trip lever 13 pivotally mounted about the pivot shaft 14. Engagement between the clutch trip latch lever 13 and the armature 11 is maintained through the instrumentality of a tension spring 16 attached to the free end of the lever 13. Slightly above the engaged portion of the trip lever 13, there is a portion of the lever 13 recessed to provide a latch; the function of which is to permit the lever 13 to pivot in a clockwise direction when the armature 11 is released by the magnet 10. The upper portion 17 of the trip lever 13 is U-shaped to provide a resilient engaging arm for a detent 18 attached to a friction clutch 19. There is also formed on the trip lever 13 an abutment 20 adapted to follow the periphery of a cam 21 mounted on the shaft 22. Secured to the shaft 22 is a set of five selector cams 23 adapted to cooperate with and control the position of a plurality of cam followers 24 (see Figs. 2 and 3). Another cam 26, fixed to the shaft 22, controls the position of an armature lock lever 27.

Rotative power is supplied to a shaft 28 through the instrumentality of a spur gear 29 secured to the shaft 28. The source of rotative power is from an electric motor associated with the telegraph receiving apparatus and is continuously rotated at all times. It is the rotative power supplied through the shaft 28 that is utilized to rotate the shaft 22 when the clutch 19 is actuated. This rotative power is also utilized to rotate a pair of cams 31 and 32 which, as disclosed in the above-identified S. Morton et al. patent, control the operation of both the printing and perforating mechanism of the telegraph receiver. Rotative power from the shaft 28 cannot reach the cams 31 and 32 until it has passed through a clutch 33 which is normally maintained disengaged by means of a clutch trip lever 34.

When the shaft 22 is rotated, a cam 36 affixed thereto causes a trip latch 37 to pivot, thereby withdrawing a dog 38 from engagement with a clutch 39 interposed between a hollow shaft 41 and a drive sleeve 42. The drive sleeve 42 has mounted thereon a gear 43 which engages a gear 44 securely fixed to the constantly rotating shaft 28, consequently, upon release of the clutch 39 rotative power is imparted from the shaft 28 through the gears 44 and 43 to the sleeve 42 and from there through the clutch 39 to the shaft 41.

Figures 3, 4:
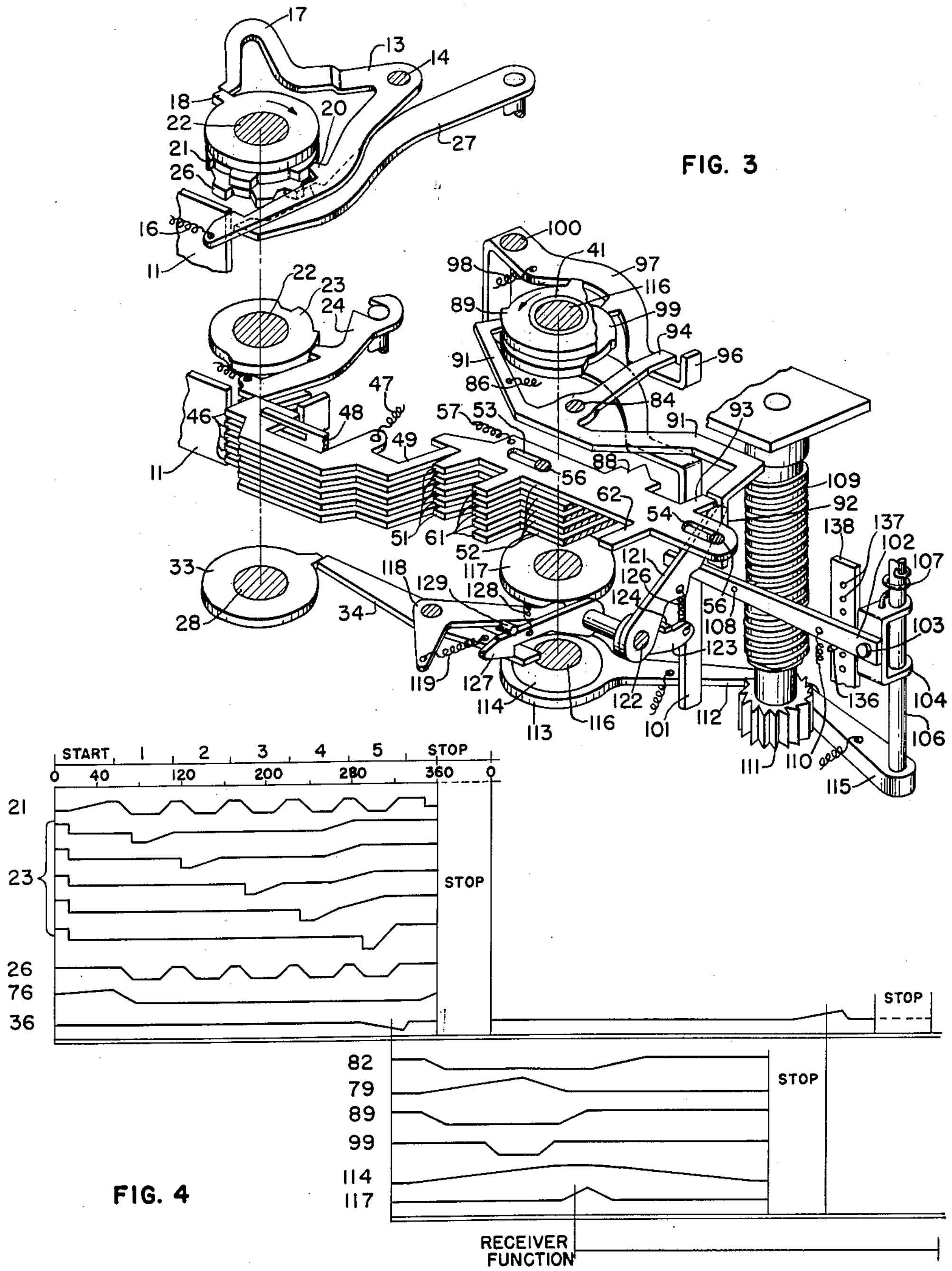
Fig. 3 is a perspective view partially broken away illustrating the major components of the disabling apparatus.
Fig. 4 is a timing diagram depicting the contours of a plurality of cams utilized to perform various functions in the operation of the telegraph receiver plotted against the angular displacement of the shafts upon which the cams are respectively mounted.

Returning now to a consideration of the elements associated with the armature 11 and the cam followers 24, there is shown in Fig. 1 a plurality of interponents 46, each individually urged by a spring 47 into engagement with the lower extremity of the cam followers 24. The interponents 46 are spaced apart by means of a comb 48 having its teeth interposed between the interponents. Each interponent 46 has formed thereon an extending arm 49 adapted to nest within a notch formed by an extension 51 on a selector slide 52. Each of the selector slides 52 has formed therein a pair of longitudinal extending slots 53 and 54, and positioned within each set of slots is a guide rod 56. Urging the selector slides 52 in a leftwardly direction, as viewed in Figs. 1 and 3, is a tension spring 57; thus, the position of the slides 52 is determined by the guide rods 56 engaging the right hand walls of the slots 53 and 54. Each selector slides 52 has formed thereon a pair of abutments 61 and 62. Positioned beneath each pair of abutments 61 and 62 is a sword 63 having arms 64 and 66 extending therefrom in a lateral direction. The swords 63 are each pivotally mounted on a pivot rod 67 attached to a spring biased bail 68 pivotally mounted on a stud 69. Each sword 63 is adapted to cooperate with a T-lever 71 pivotally mounted on a pivot rod 72. The positions assumed by the T-levers 71 determines the positions assumed by a series of notched permutation bars 73 which in turn control the operation of a printer or perforating mechanism.

The details of the printing and perforating mechanism are not described in the present description since a complete description of these mechanisms is given in the afore-identified patent to S. Morton et al. As described in the S. Morton et al. patent, the positions assumed by the notched permutation bars 73 controls the particular type of function that is performed by the telegraph apparatus in response to the various telegraph signals received over the signalling line.

In Fig. 2, there is shown a cam 76 mounted on shaft 22 adapted to control the position of a spring biased stripper bail 77. The stripper bail 77 is pivotally mounted at one end and is bent over at its free end to provide a blade 78 (Figs. 1 and 2) adapted to span all of the trailing ends of the interponents 46.

Considering now the shaft 41, there is shown in Fig. 2, a cam 79 mounted on the shaft and adapted to cooperate with and control the position of a follower roller 81 secured to the free end of the L-shaped sword bail 68 (Fig. 1). Also mounted on the shaft 41 is a cam 82 adapted to actuate a selector slide lock lever 83. The lock lever 83 is urged to pivot about a shaft 84 through the instrumentality of a tension spring 86 whereby the lock lever is maintained in engagement with the periphery of the cam 82. The lower end of the lock lever 83 is bent over to provide an extension 87 to cooperate with a plurality of double bevelled projections 88 individually formed on each one of the selector slides 52.

A cam 89 is also mounted on the shaft 41 and is adapted to control the position of a sensing lever 91 pivotally mounted on the pivot shaft 84. The lower extremity of the sensing lever 91, as viewed in Figs. 1 and 3, is bent over to provide an element 92 which is spaced from but in register with a plurality of projections 93 individually formed on each of the selector slides 52. The sensing lever 91 has integrally formed thereto a blocking element 94 which extends to and terminates in the vicinity of a dog 96 integrally forming a part of a cam follower 97. Cam follower 97 is urged by a spring 98 to follow the periphery of a cam 99 attached to the shaft 41. The follower 97 is in the shape of a U and is pivotally mounted on a shaft 100. The trough of the U-shaped follower 97 extends over the length of the shaft 41 and the lower arm of the U, as shown in Figs. 2 and 3, is bent over to provide a lift bar or bail 101. Positioned in engagement with the lift bar 101 is a worm follower 102 pivotally mounted by a pin 103 on a U-shaped bracket 104. The U-shaped bracket 104 is apertured to receive a supporting rod 106 secured to the frame of the apparatus. A coil spring 107 (see Figs. 2 and 3) is attached at one end to the bracket 104 and at its other end to the supporting rod 106. The coil spring 107 urges the bracket 104 and follower 102 about the supporting rod 106 to move a guide pin 108 secured to the follower into engagement with the teeth of a worm 109. Connected to the worm follower 102 is a tension spring 110 tending to move the worm follower 102 in a downward direction as viewed in Figs. 2 and 3. Mounted on the shaft of the worm 109 is a ratchet 111 adapted to be actuated by a pawl 112. The pawl 112 has an enlarged head 113 which is apertured to receive an eccentric 114 mounted on a shaft 116. The shaft 116 extends through the sleeve 42 and up into the hollow shaft 41 where suitable means are provided to secure the shaft 116 within the hollow shaft 41. There is also mounted on the supporting rod 106 a spring biased anti-backlash follower 115 adapted to engage the teeth of the ratchet 111 and hold the ratchet in its advance position. Secured to the shaft 116 is a cam 117 adapted to control the operation of an L-shaped follower 118. The L-shaped follower 118 is pivotally mounted on the trip lever 34. Interconnecting one arm of the L-shaped follower 118 and the trip lever 34 is a spring 119 adapted to urge this arm into overlapping relationship with the trip lever 34 and as a consequence the L-shaped follower 118 is urged into engagement with the cam 117.

Positioned within the orbit of pivotal movement of the worm follower 102 is an operating lever 121 pivotally mounted about a stud shaft 122. Secured to the shaft 122 is an arm 123 having detent 124 extending therefrom to engage the operating lever 121 and hold the arm against the action of a spring 126 interconnecting the lever 121 and the arm 123. There is secured to the stud shaft 122 a latch 127 urged by a spring 128 into engagement with a stop pin 129. The latch 127 is mounted in such a position that upon pivoted movement of the stud shaft 122 the latch 127 is moved into engagement with the trip lever 34 to prevent the trip lever from releasing the clutch 33 and hence prevent rotative movement from being imparted to the cams 31 and 32 to prevent the operation of the receiving function mechanism.

In operation of the apparatus, telegraph signals each in the form of a start impulse, five intelligence impulses, and a stop impulse are received by the selector magnet 10. In consideration of the operation of the apparatus particular attention is directed to Fig. 4 wherein the contours of the various cams are shown in relation to the angular position of their respective shafts. In addition the contours of the cams are plotted against the elements of the incoming signal to show which portion of the cams are presented to the respective followers during reception of each element of a complete telegraph signal.

Upon the reception of the start impulse which is a no current or spacing impulse by the selector magnet 10, the armature 11 is released to move up in alignment with the recessed notch formed in the clutch trip lever 13. As shown in Fig. 4, the cam 21 in the rest position presents a low portion to the abutment 20 formed on the clutch trip lever 13; consequently, upon reception of the start impulse the trip lever 13 pivots about the pivot shaft 14 under the impetus of the extended tension spring 16 to withdraw the end of the U-shaped arm 17 from engagement with the detent 18 of the friction clutch 19. Release of the friction clutch 19 allows rotative power to be imparted through the clutch 19 from the constantly rotating shaft 28 to effect a cycle of rotation of the shaft 22. Immediately after the shaft 22 initiates rotation, the selector cam followers 24 are permitted to fall off the high portions of the cams 23 (see Figs. 3 and 4) to partially move the ends of the followers 24 from beneath the ends of the interponents 46.

For the purposes of illustration assume that the first intelligence impulse is a no current or spacing impulse, then the armature 11 will be released to permit the trip lever 13 to drop into the second recessed portion of the cam 21. Movement of the trip lever 13 moves the lip of its notched portion beneath the armature 11 to hold the armature 11 in the released position during the period that the abutment 20 rides within the second recessed portion of the cam 21. The armature lock lever 27 is not permitted to move into the first recessed portion of the cam 26 because the armature 11 engages and blocks the end of the armature lock lever. Maintenance of the armature 11 in the released position precludes movement of the first cam follower 24 within the recess formed in the first cam 23 which is now presented to its associated cam follower 24. Consequently, the first interponent 46 associated with the first cam follower 24 is maintained in the position shown in Figs. 1 and 3. Inasmuch as the interponent 46 is maintained in its rest position, the selector slide 52 associated therewith is also maintained in the position shown in Figs. 1 and 3.

If, however, the first intelligence impulse is a current or marking impulse then the armature 11 is drawn up and the armature lock lever 27 is permitted to fall within the first recess of the cam 26 to abut against the armature 11 and hence hold the armature in position during the period of reception of the first impulse. Movement of the armature 11 to the drawn up position withdraws the tip of the armature from the ends of the cam followers 24 to permit the first cam follower to fall within the recessed portion of the first cam 23 to remove its end from beneath the tip of the interponent 46. The interponent 46 is now permitted to slightly pivot under the impetus of the spring 47 about the point where the arm 49 engages the selector slide 52. As the cam 23 continues to rotate the abutment formed on the cam follower 24 moves out of the recessed portion of the cam 23 and as a consequence the forward face of the follower 24 engages the interponent to slide the interponent within the comb 48. Movement of the interponent 46 is immediately imparted through the arm 49 to the selector slide 52.

It is to be understood that the other received intelligence impulses comprising an incoming signal perform like functions in positioning the armature 11 and the low portions of the cams 23 are presented in timed sequence with the reception of each intelligence impulse to their respective followers 24. At the end of the reception of the five intelligence impulses, the five selector slides 52 are permutatively positioned in accordance with the received five intelligence impulses.

Referring to Fig. 4, it is to be observed that at about the time of the reception of the fifth impulse a low portion of the cam 36 is presented to the trip latch 37 to allow the trip latch to pivot and withdraw the dog 38 from engagement with the friction clutch 39. Release of the friction clutch 39 permits power to be imparted from the shaft 28, through the gears 44 and 43, through the drive sleeve 42, through the clutch 39 to the hollow shaft 41. The hollow shaft 41 starts to rotate and immediately thereafter the cam 82 presents a low portion to the lock lever 83 whereupon the lock lever is moved downwardly to engage one side or the other of the bevelled projections formed on the selector slides 52 to positively latch the selector slides in their permutative setting.

Next in the sequence of operations, the cam 79 mounted on the hollow shaft 41 presents a high portion to the follower roller 81 thereby causing the L-shaped sword bail 68 to pivot in a counterclockwise direction as viewed in Fig. 1. Movement of the bail 68 draws the swords 63 up towards the selector slides 52. The slides 52 which are positioned in accordance with spacing impulses retain the positions shown in Figs. 1 and 3 and consequently the abutments 61 thereon are in register with the upturned ends of the arms 64; therefore, engagement of the arm 64 with the abutment 61 maintains the sword in the positions shown. Those selector slides 52 which have been positioned in accordance with the reception of marking impulses are latched in a position wherein the abutments 62 are in register with the upturned ends of the arms 66 and, consequently, upon the upward movement of the sword 63 those swords whose arms 66 are in register with the abutment 62 are pivoted in a clockwise direction as viewed in Fig. 1.

When the lobe on the cam 79 has passed the roller 81, the sword bail 68 is returned to its initial position to move the permutatively positioned swords into engagement with either the lower or upper arms of the respective T-levers 71. Those swords which are maintained in the position shown in Fig. 1 act to maintain the T-levers in the position shown, however, those swords which have been pivoted engage the upper arms of the T-levers 71 to pivot the T-levers in a counterclockwise direction. Movement of the T-levers 71, as previously indicated, control the position of the notched permutative bars 73. The positions assumed by the notched permutation bars 73 control the particular type of function that is to be performed by the telegraph receiver in response to the incoming telegraph signal. A complete description of the mechanism controlled by the notched permutation bars is completely given in the afore-identified patent to S. Morton et al. and hence it is not deemed pertinent to repeat that description in the present description.

As the shaft 41 and the shaft 116 attached thereto reach the midpoint in a cycle of revolution, the cam 117 mounted on the shaft 116 presents a lobed portion to the L-shaped follower 118. The L-shaped follower 118 pivots thereby extending the spring 119 and as a consequence the trip lever 34 is caused to pivot out of engagement with the clutch 33. Release of the clutch 33 permits power to be imparted from the constantly rotating shaft 28, through the clutch 33 to the cams 31 and 32. These cams control the operation of the printing and perforating apparatus associated with the receiver and the particular linkages and mechanisms actuated by these cams is completely described in the afore-mentioned patent to S. Morton et al.

In order to restore the interponents to their initial position shown in Fig. 1, the stripper blade 78 is utilized to engage all of the interponents 46 and move them into the spacing position shown in Fig. 1. The blade 78 is mounted on the stripper bail 77 and the stripper bail is adapted to follow the periphery of a cam 76 (see Fig. 4). Examination of Fig. 4 reveals that the stripper bail 77 holds the blade 78 spaced from the interponents 46 during periods in which the intelligence impulses are being received by the selector magnet 10, however, upon completion of the reception of the intelligence impulses, the stripper bail 77 is moved towards the interponents 46 and during the period in which a subsequent signal is received by the selector magnet and more particularly in the period in which the start impulse is received, the stripper bail 77 and 78 is further moved to restore the interponents to the position shown in Fig. 1. Following reception of the start impulse the stripper bail 77 immediately falls from the high portion of its cam to permit the permutative movement of the interponents 46 in accordance with the intelligence impulses received by the selector magnet 10.

Considering now the mechanism for operating the disabling apparatus, attention is first directed to cam 89 which shortly after initiation of rotation of the hollow shaft 41 presents a recessed portion to the sensing lever 91 whereupon the sensing lever 91 is permitted to pivot under the impetus of the spring 86. Movement of the sensing lever 91 is blocked if any of the abutments 93 formed on the selector slides 52 are in alignment with the bent over element 92. This condition will occur every time one of the selector slides is maintained in position by a spacing intelligence impulse. In situations wherein blank letters signals are received by the selector magnet 10, all five selector bars are moved to their marking position whereupon the bent over element does not engage any of the projections 93 and as a consequence the sensing lever 91 is permitted to follow the contour of the cam 89.

Shortly after the operation of the sensing lever 91, the cam 99 presents a low portion to an abutment formed on the cam follower 97. If the sensing lever 91 has ascertained the presence of five selector slides 52 in the marking position, then the blocking element 94 is positioned in register with the dog 96 and the follower 97 is precluded from following the periphery of the cam 99, however, if any of the selector slides are positioned in accordance with a spacing impulse then the sensing lever 91 is blocked from movement and hence the blocking element 94 is not in register with the dog 96 and the cam follower 97 can follow the periphery of the cam 99. When the follower 97 falls within the recessed portion in the cam 99, the lift bar 101 is moved into engagement with the worm follower 102 to pivot the worm follower about the supporting rod 106 against the influence of the spring 107. Movement of the worm follower 102 moves the guide pin 108 from engagement with the teeth of the worm 109. If the worm 109 has advanced the worm follower from its initial rest position as determined by a stop pin 136, then the spring 110 will be rendered effective to pivot the follower 102 about the pivot pin 103 to return the follower to its rest position in engagement with the stop pin 136.

In operation of certain types of two channel communication systems when one channel is not in the process of transmitting intelligence signals, signals in the form of letters signals are imparted to the idle transmission channel. These letters signals consist of a no current start impulse, five intelligence impulses in the form of current or marking impulses, followed by a stop impulse. When the five selector slides 52 are positioned in accordance with five marking intelligence impulses, then the projections 93 are withdrawn from register with the bent over element 92 and hence the sensing lever 91 is permitted to follow the contour of the cam 89 thereby moving the blocking element 94 into register with the dog 96. When this occurs, the follower 97 is precluded from following the contour of the cam 99 hence the lift bar 101 is not moved. The pin 108 on the worm follower 102 maintained in engagement with the threads of the worm 109 and consequently is advanced upwardly away from the stop pin 136 each time the worm 109 is advanced. Worm 109 is advanced by the pawl 112 being actuated by the eccentric 114, thus each time the shaft 116 is rotated, the eccentric 114 moves the pawl 112 to advance the ratchet 111 one increment. Each reception of a letters signal causes the follower 102 to advance a distance as determined by the advance of the worm 109 and after a predetermined number of such advancements the follower 102 is moved to engagement with the operating elever 121 to cause said operating lever to pivot about the stud shaft 122. Pivotal movement of the operating lever 121 is imparted to the arm 123 by the extension of the spring 126. Movement of the arm 123 is imparted through the stud shaft 122 to the latch 127 to move the latch from the pin 129 against the influence of the spring 128 into engagement with the clutch trip lever 34. The clutch trip lever 34 now being blocked from movement by the latch 127 maintains the clutch 33 disengaged and as a consequence rotative movement from the constantly rotating shaft 28 is prevented from reaching the cams 31 and 32, therefore, precluding the operation of the printing or perforating mechanism in the telegraph receiving apparatus. Clutch trip lever 34 is prevented from movement even though the cam 117 operates the L-shaped follower 118 because movement of the L-shaped follower 118 is dissipated in an extension of the spring 119.

Upon the first reception of a signal other than a letters signal, the sensing lever 91 is prevented from following the periphery of the cam 89 by the projection 93 engaging the bent over element 92 of the sensing lever 91. When this occurs, the blocking element 94 is precluded from moving into register with the dog 96 and as a consequence the cam follower 97 is permitted to fall within the recessed portion of the cam 99. Movement of the follower 97 is imparted to the lift bar 101 to immediately move the pin 108 of the worm follower 102 from engagement with the worm 109, therefore allowing the extended spring 110 to restore the worm follower 102 to its initial rest position in engagement with the stop pin 136. The worm follower 102 immediately moves from engagement with the operating lever 121 to restore the operating lever to its initial position. The restoration of the operating lever 121 to its initial position permits the spring 128 to withdraw the latch 127 from engagement with the clutch trip lever 34 whereby the next operation of the cam 117 operates the L-shaped follower 118 to again allow the clutch trip lever 34 to be withdrawn from the clutch 33 by the extension of the spring 119. It may be thus appreciated that the reception of any signal other than the letters signal immediately conditions the receiving apparatus for the proper function of said apparatus in accordance with the first non-letters signal received and therefore no incoming signals are lost due to the operation of disabling apparatus.

It is to be understood that other preconcerted signals besides a letters signal could be utilized to operate the disabling apparatus. The disabling apparatus may be conditioned for operation in response to other than letters signals by varying the projections 93 formed on the selector slides 52. In such a situation it would be necessary that the projections formed on the selector slides 52 be all withdrawn from beneath the bent over element 92 when the predetermined signal is received by the receiving apparatus. Another method that could be utilized to vary the preconcerted signal to which the disabling apparatus is rendered operative could be obtained by varying the shape of the sensing element 92 to permit movement of the bent over element 92 when any predetermined permutation is imparted to the projections 93.

The number of signals that must be received before the disabling apparatus is rendered operative can be varied by moving the pin 136 to within a number of other apertures 137 provided in a pin support 138. Movement of the pin 136 into one of the apertures 137 positioned above the one shown in Fig. 3 permits the disabling apparatus to operate upon reception of a less number of preconcerted signals whereas the movement of the pin 136 to an aperture position beneath the one shown precludes the operation of the disabling apparatus until a greater number of preconcerted signals are received by the receiving apparatus.

It is to be understood that the above described arrangements of apparatus and construction of elemental parts are simply illustrative of the principles of the invention and many other modifications and changes may be made without departing from the invention.

What is claimed is:

1. In a telegraph receiving apparatus, means permutatively positioned in accordance with a permutation of impulses of an incoming telegraph signal, a counting device including an element adapted to be advanced in one step increments, means for actuating the counting device upon each reception of a signal to advance said element one step, means for restoring the element to its initial position following each reception of a signal, a lever for sensing the permutatively positioned means operated by the sensing lever, and means for rendering ineffective said restoring means upon the sensing lever ascertaining a predetermined setting of the positioned means.

2. In a telegraph receiver, storage elements, means for permutatively positioning the storage elements in accordance with a permutation of impulses of an incoming telegraph signal, means actuated by the permutative positions assumed by the storage elements for controlling the operation of the telegraph receiver, means for sensing the permutative positions assumed by the storage elements, a counting means, means actuated by the sensing means perceiving a preconcerted permutation of the storage elements for actuating the counting means, means operated by a predetermined number of successive actuations of the counting means for preventing the operation of the telegraph receiver, and means controlled by the sensing means perceiving other than said preconcerted permutative positionment of said storage elements for restoring the counting means to its non-actuated condition.

3. In a telegraph receiving apparatus, means positionable in accordance with a permutation of impulses of an incoming telegraph signal, a worm and follower, means for advancing the worm and follower one increment upon each reception of a telegraph signal, means for lifting the follower from the worm, means for returning the follower to an initial position upon being lifted from the worm, means actuated by a preconcerted setting of the positionable means for precluding the operating of the lifting means, a clutch controlled functioning means, means for releasing the clutch each time a telegraph signal is received, and means actuated by a predetermined number of successive advancements of the worm follower for preventing the release of the clutch.

4. In a telegraph receiver, storage elements, means for permutatively positioning the storage elements in accordance with a permutation of impulses of an incoming telegraph signal, means for conditioning the receiver for operation in accordance with the positions assumed by the storage elements, clutch means for controlling the operation of the conditioned receiver, means for sensing the positions assumed by the storage elements, a worm and follower mechanism, means for advancing the worm and follower mechanism each time the storage elements are positioned by an incoming signal, means for removing the follower from the worm following each sensing operation, means for returning the follower to its initial position upon being removed from the worm, means for blocking the operation of the removing means when the sensing means perceives a predetermined setting of the storage elements, a latch adapted to preclude the operation of the clutch means, and means engaged by the follower after a predetermined number of successive advancements by the worm for moving the latch into position to preclude the operation of the clutch means.

5. In a telegraph receiving apparatus, means permutatively positioned in accordance with a permutation of impulses of an incoming telegraph signal, a clutch controlled operating means, means for releasing the clutch following the positionment of the positioned means in accordance with each signal, means for sensing the positioned means, a worm and follower, means for advancing the worm and follower subsequent to each receipt of an incoming signal, a stop for establishing the initial position of the follower, means for lifting the follower from the worm subsequent to the receipt of each incoming signal, means for moving the follower into engagement with the stop, means for precluding the operation of the lifting means, said precluding means rendered operative upon the sensing means ascertaining a preconcerted setting of the positioned means, means operated by a predetermined number of successive advancements of the follower by the worm for preventing the operation of the clutch controlled operating means, and means for varying the position of the stop to vary the number of successive advancements of the follower required to operate the means for preventing the operation of the clutch controlled operating means.

6. In a telegraph receiving apparatus, a plurality of elements, means responsive to a permutation of impulses of a telegraph signal for accordingly permutatively positioning said elements, mechanisms adapted to perform functions in accordance with each permutative setting of said elements, a clutch for initiating the operation of said mechanisms, a lever for holding the clutch, means for releasing the lever upon receipt of each signal, counting means, means for advancing the counting means upon receipt of each signal, a bail for restoring the counting means to the initial condition following receipt of each signal, means for sensing each permutative setting of said elements, a blocking element positioned by said sensing means ascertaining a predetermined setting of said elements for precluding the operation of said bail, a latch operated by said counting means being advanced a predetermined number of successive increments for preventing the release of said clutch holding lever.

7. A telegraph recording apparatus comprising storage elements, means responsive to each incoming signal to permutatively position the storage elements in accordance with the permutation of impulses in each signal, mechanisms for performing functions in response to each setting of the storage elements, a clutch for controlling the mechanisms in the performance of each function, a lever for holding the clutch, means for releasing the lever subsequent to each permutative positionment of the storage elements, a latch adapted to prevent the release of the lever, a counting mechanism having a follower element adapted to be advanced thereby, means for sensing each setting of the storage elements, means controlled by the sensing means ascertaining a predetermined setting of the storage elements for operating the counting mechanism to move the follower element, means actuated by a predetermined number of successive movements of the follower element for engaging and moving the latch into position to block the lever, and means controlled by the sensing means ascertaining other than said predetermined setting of the storage elements for restoring the follower element to the initial position.

References Cited in the file of this patent

UNITED STATES PATENTS

| | | |
|---|---|---|
| 911,016 | Kirnan | Jan. 26, 1909 |
| 1,380,679 | Rainey | June 7, 1921 |
| 1,648,974 | Vernam | Nov. 15, 1927 |
| 1,688,711 | Hewitt et al. | Oct. 23, 1928 |
| 1,943,475 | Gurley | Jan. 16, 1934 |
| 2,344,792 | Swezey | Mar. 21, 1944 |
| 2,554,835 | Malina | May 29, 1951 |
| 2,618,699 | Dain | Nov. 18, 1952 |
| 2,659,879 | Pappenfus | Nov. 17, 1953 |